United States Patent [19]

Cseh et al.

[11] Patent Number: 4,670,486
[45] Date of Patent: Jun. 2, 1987

[54] POLYMER COMPOSITION PIGMENTED WITH COPPER OR NICKEL COMPLEXES OF LIGANDS CONTAINING A SEMICARBAZONE MOIETY

[75] Inventors: Georg Cseh, Posat; Paul Lienhard, Frenkendorf, both of Switzerland

[73] Assignee: Ciba-Geigy Corporation, Ardsley, N.Y.

[21] Appl. No.: 745,034

[22] Filed: Jun. 13, 1985

[30] Foreign Application Priority Data

Jun. 15, 1984 [CH] Switzerland ................ 2915/84

[51] Int. Cl.[4] ............... C09B 45/48; C09B 63/00; C09B 67/20; C09D 3/48
[52] U.S. Cl. ............................ 524/93; 8/552; 8/685; 8/686; 8/920; 8/928; 8/DIG. 9; 106/288 Q; 106/289; 106/308 Q; 106/309; 523/458; 523/459; 523/461; 524/92; 524/96; 524/99; 524/190; 534/695; 534/701; 534/704; 534/713; 534/721; 534/725; 534/738
[58] Field of Search ............ 534/738, 704, 721, 725, 534/695, 654, 701, 713, 721, 720; 106/288 Q, 308 Q, 289, 309; 8/552, 930, 928, DIG. 9, 662, 688

[56] References Cited

U.S. PATENT DOCUMENTS

| | | | |
|---|---|---|---|
| 2,726,238 | 12/1955 | Morschel et al. | 534/738 X |
| 2,889,317 | 6/1959 | Long et al. | 534/704 X |
| 2,985,646 | 5/1961 | Schetty et al. | 534/738 X |
| 3,073,851 | 1/1963 | Steiger, I | 534/738 X |
| 3,153,033 | 10/1964 | Steiger, II | 534/738 |
| 3,389,132 | 6/1968 | Dressler et al. | 534/738 X |
| 4,105,654 | 8/1978 | Bloom et al. | 534/738 X |
| 4,315,854 | 2/1982 | Puntener et al. | 534/738 X |
| 4,327,168 | 4/1982 | Hashimoto | 534/738 X |

FOREIGN PATENT DOCUMENTS

| 1016964 | 1/1966 | United Kingdom | 534/738 |
| 2119793 | 11/1983 | United Kingdom | 534/738 |

OTHER PUBLICATIONS

Kimura et al., Chemical Abstracts, vol. 63, 4422–4423 (1965).
Mahan Das et al., J. Inorg. Nucl. Chem., vol. 36, pp. 937 to 939 (1974).
Derwent Abstract 08125 J/50 of Japanese Sho 57/180,660 (Dainippon).

*Primary Examiner*—Floyd D. Higel
*Attorney, Agent, or Firm*—Luther A. R. Hall

[57] ABSTRACT

High molecular weight organic material is effectively colored by the incorporation therein of a copper or nickel complex of the ligand compound of formula I

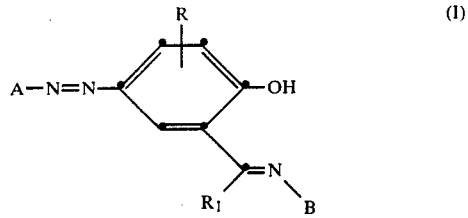

wherein A is an isocyclic or heterocyclic aromatic moiety, R is H, halogen, lower alkyl or alkoxy, $R_1$ is H, lower alkyl, phenyl or substituted phenyl, and B is H, lower alkyl, ureido or substituted ureido, guanidino, anilino, benzamido or a heterocyclic aromatic moiety.

8 Claims, No Drawings

POLYMER COMPOSITION PIGMENTED WITH COPPER OR NICKEL COMPLEXES OF LIGANDS CONTAINING A SEMICARBAZONE MOIETY

The invention relates to novel azomethine, semicarbazone and hydrazone metal complexes, to their preparation, and to their use for colouring high-molecular organic material.

Azomethine metal complexes from salicylaldehyde derivatives and o-hydroxyarylamines and their use as printing inks are known and described in Japanese Published Specification No. 57-180,660.

The present invention provides novel transition metal complexes of ligands of the formulae I and II

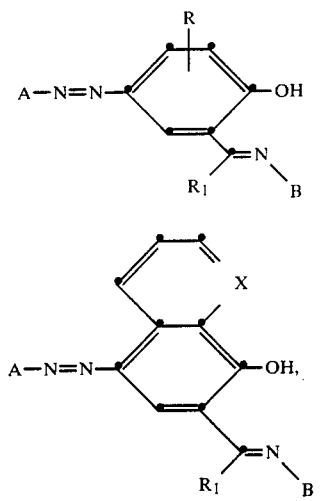

in which A is an isocyclic or heterocyclic aromatic radical, R is —H, halogen, $C_1$-$C_4$—alkyl or $C_1$-$C_4$—alkoxy, $R_1$ is —H, $C_1$-$C_4$—alkyl or phenyl which is unsubstituted or substituted by halogen, $C_1$-$C_4$—alkyl, $C_1$-$C_4$—alkoxy, —$NO_2$, —$CONH_2$, $CONHR_2$ or $C_2$-$C_5$—N—alkylcarbamoyl, X is —CH= or —N= and B is —H, $C_1$-$C_4$—alkyl, —$NHCONH_2$, —NHCONH—$C_1$-$C_4$—alkyl, —$NHCONHR_2$, —$NHCSNH_2$, —$NHCSR_3$, —NHC(NH)$NH_2$, —$NHR_2$, —$NHCOR_3$, —$NHSO_2R_3$, or a heterocyclic aromatic radical, $R_2$ being phenyl which is unsubstituted or substituted by halogen, —$CF_3$, $C_1$-$C_4$—alkyl, $C_1$-$C_4$—alkoxy, —$NO_2$, —CN, —$CONH_2$, —$SO_2NH_2$, —CONH—$C_1$-$C_4$—alkyl, —$CONHC_6H_5$, $C_2$-$C_5$—alkoxycarbonyl, phenoxycarbonyl, $C_2$-$C_5$—N—alkylcarbamoyl, —$NHCOC_6H_5$ or —$SO_2NHC_1$-$C_4$—alkyl or —$SO_2NHC_6H_5$ and $R_3$ being phenyl which is unsubstituted or substituted by halogen, $C_1$-$C_4$—alkyl, $C_1$-$C_4$—alkoxy, —$NO_2$, $C_2$-$C_5$—N—alkylcarbamoyl or —$NHCOC_6H_5$ or being a heterocyclic aromatic radical, and the transition metal is a doubly positively charged metal ion.

The transition metal can be in particular doubly positively charged metal ions, such as $Ni^{2+}$, $Cu^{2+}$, $Co^{2+}$, $Zn^{2+}$, $Mn^{2+}$, $Fe^{2+}$, $Cd^{2+}$ and $Pt^{2+}$, preferably $Ni^{2+}$, $Cu^{2+}$, $Co^{2+}$ and $Zn^{2+}$, but especially $Ni^{2+}$ and $Cu^{2+}$. It is also possible to use mixtures of metal complexes, for example mixtures of Ni and Zn or of Co and Zn complexes.

1 or 2 radicals of a ligand of the formulae I or II can be present per metal ion, so that 1:1 or 1:2 metal complexes of neutral character can be present.

The alkyl group in $C_1$-$C_4$—alkyl R, $R_1$ and B and in phenyl $R_1$, $R_2$ and $R_3$ which is substituted by $C_1$-$C_4$—alkyl groups is for example a methyl, ethyl, n-propyl, isopropyl, n-butyl, isobutyl or tert.-butyl group and the alkoxy group in $C_1$-$C_4$—alkoxy R and in phenyl $R_1$, $R_2$ and $R_3$ which is substituted by $C_1$-$C_4$—alkoxy groups is for example a methoxy, ethoxy, n-propoxy, isopropoxy, n-butoxy, isobutoxy or tert.-butoxy group, but the groups in question are in particular methyl and methoxy groups respectively. The phenyl radical can be substituted by one to three such groups.

Halogen R and the halogen in halogen-substituted phenyl $R_1$, $R_2$ and $R_3$ is fluorine, chlorine, bromine or iodine, but in particular chlorine, The alkyl group in —NHCONH$C_1$-$C_4$—alkyl B is for example a methyl, ethyl, isopropyl or tert.-butyl group, but in particular a methyl group.

The alkyl group in phenyl $R_2$ which is substituted by —CONH—$C_1$-$C_4$—alkyl is for example a methyl, ethyl, n-propyl, isopropyl, n-butyl, isobutyl or tert.-butyl group, but in particular a methyl group.

The alkoxycarbonyl group in phenyl $R_2$ which is substituted by $C_2$-$C_5$—alkoxycarbonyl is a methoxycarbonyl, ethoxycarbonyl, propoxycarbonyl, isopropoxycarbonyl, butoxycarbonyl, isobutoxycarbonyl or tert.-butoxycarbonyl group, but in particular a methoxycarbonyl or ethoxycarbonyl group.

The alkylcarbamoyl group in phenyl $R_1$, $R_2$ and $R_3$ which is substituted by $C_2$-$C_5$—N—alkylcarbamoyl is an acetylamino, propylamino, butyrylamino, isobutyrylamino, valerylamino or isovalerylamino group, but in particular an acetylamino group.

The alkyl group in phenyl $R_2$ which is substituted by —$SO_2NHC_1$-$C_4$—alkyl is for example a methyl, ethyl, propyl, isopropyl or butyl group.

The groups in phenyl $R_2$ which is substituted by —$CONHC_6H_5$, —$NHCOC_6H_5$ or —$SO_2NHC_6H_5$ groups and phenyl $R_3$ which is substituted by the —$NHCOC_6H_5$ group can further substituents, such as chlorine atoms and/or methyl and/or methoxy groups.

A heterocyclic aromatic radical A and B is derived for example from the following heterocyclic amines: 5-aminobenzimidazolone, 5-amino-1-methylbenzimidazolone, 5-amino-1-n-butylbenzimidazolone, 5-amino-1-phenylbenzimidazolone, 5-amino-1-p-chlorophenylbenzimidazolone, 5-amino-1-p-methylphenylbenzimidazolone, 5-amino-1-p-methoxyphenylbenzimidazolone, 5-amino-6-chlorobenzimidazolone, 5-amino-6-bromobenzimidazolone, 5-amino-6-methylbenzimidazolone, 5-amino-6-methoxybenzimidazolone, 6-aminobenzoxazolone, 5-aminobenzoxazolone, 5-amino-7-chlorobenzoxazolone, 6-amino-5-chlorobenzoxazolone, 6-amino-5-methylbenzoxazolone, 6-amino-5-chlorobenzothiazolone, 6-amino-5-methylbenzothiazolone, 6-aminoquinazol-4-one, 6-amino-2-methylquinazol-4-one, 6-amino-2-methoxyquinazol-4-one, 6-amino-7-chloro-2-methylquinazol-4-one, 7-aminoquinazol-4-one, 2-(4'-aminophenyl)-quinazol-4-one, 2-(3'-aminophenyl)-quinazol-4-one, 2-(4'-amino-3'-methoxyphenyl)-quinazol-4-one, 2-(4'-amino-3'-chlorophenyl)-quinazol-4-one, 2-(3'-amino-4'-methylphenyl)-quinazol-4-one, 6-amino-2,4-dihydroxyquinazoline, 7-aminophenmorphol-3-one, 6-aminophenmorphol-3-one, 7-amino-6-chlorophenmorphol-3-one, 7-amino-6-methylphenmorphol-3-one, 7-amino-6-methoxyphenmorphol-3-one, 6-aminoquinol-2-one, 6-amino-4-methylquinol-2-one, 7-amino-4-methylquinol-2-one, 7-amino-4,6-dimethylquinol-2-one, 6- amino-7-chloro-4-methylquinol-2-one, 7-amino-4-methyl-6-methoxyquinol-2-one, 6-amino-1,3-dihydroxyisoquinoline, 6-amino-2,4-dihydroxyquinoline, 6-amino-2,3-dihydroxyquinoxaline and 4-aminophthalimide.

An isocyclic aromatic radical A is preferably a monocyclic to tetracyclic, in particular monocyclic or bicyclic radical, such as phenyl, biphenyl, naphthyl or anthraquinonyl, but in particular phenyl or naphthyl.

The radical A is preferably a phenyl radical which is unsubstituted or substituted by halogen, phenyl, phenylazo, carboxyl, —$CF_3$, —$NO_2$, —CN, $C_1$-$C_4$—alkyl, $C_1$-$C_4$—alkoxy, —$CONH_2$, —$SO_2NH_2$, —$CONHR_4$, —$COOR_5$, —$NHCOR_6$ or —$SO_2NHR_4$, $R_4$ being $C_1$-$C_4$—alkyl or phenyl which is unsubstituted or substituted by halogen, —$CF_3$, $C_1$-$C_4$—alkyl, $C_1$-$C_4$—alkoxy, —$NO_2$, —CN, —$CONH_2$, —$SO_2NH_2$, —CONH-$C_1$-$C_4$—alkyl, —$CONHC_6H_5$, $C_2$-$C_5$—alkoxycarbonyl, $C_2$-$C_5$—N—alkylcarbamoyl, —$NHCOC_6H_5$, —$SO_2NHC_1$-$C_4$—alkyl or —$SO_2NHC_6H_5$, $R_5$ being $C_1$-$C_4$—alkyl, benzyl which is unsubstituted or substituted by halogen or $C_1$-$C_4$—alkyl or phenyl which is unsubstituted or substituted by halogen, $C_1$-$C_4$—alkyl, $C_1$-$C_4$—alkoxy, $C_2$-$C_5$—alkoxycarbonyl or $C_2$-$C_5$—N—alkylcarbamoyl and $R_6$ being $C_1$-$C_4$—alkyl or phenyl which is unsubstituted or substituted by halogen, $C_1$-$C_4$—alkyl, $C_1$-$C_4$—alkoxy, —$NO_2$, or $C_2$-$C_5$—N—alkylcarbamoyl.

A heterocyclic aromatic radical $R_3$ in —$NHCOR_3$, —$NHSO_2R_3$ or —$NHCSR_3B$ is derived for example from the following heterocyclic carboxylic acids: furan-2-carboxylic acid, thiophene-2-carboxylic acid, pyrrole-2-carboxylic acid, pyridine-2-, -3- and -4-carboxylic acid, pyrazinecarboxylic acid, indole-2-carboxylic acid and quinoline-4-carboxylic acid, but especially pyridine-4-carboxylic acid.

Of particular interest are metal complexes of compounds of the formula I in which R is —H, $R_1$ is —H, —$CH_3$ or phenyl, A is the radical of the formula III

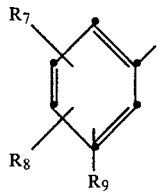
(III)

in which $R_7$ is —H, —Cl, —$CH_3$, —$OCH_3$, —$NO_2$, —$CF_3$, —CN, —COOH, —$CONH_2$, —$SO_2NH_2$, —$CONHR_{10}$ or —$NHCOR_{12}$, $R_8$ is —H, —Cl, —$CH_3$, —$OCH_3$, —$CONH_2$, or —$COOR_{11}$ and $R_9$ is —H or —Cl, $R_{10}$ being $C_1$-$C_4$—alkyl or phenyl which is unsubstituted or substituted by —Cl, —$CF_3$, —$CH_3$, —$OCH_3$, —$NO_2$, —CN, —$CONH_2$, —$SO_2NH_2$, —$CONHC_1$-$C_4$—alkyl, —$CONHC_6H_5$, $C_2$-$C_5$—alkoxycarbonyl, $C_2$-$C_5$—N—alkylcarbamoyl, —$NHCOC_6H_5$, —$SO_2NHC_6H_5$ or —$SO_2NHC_1$-$C_4$—alkyl, $R_{11}$ being $C_1$-$C_4$—alkyl, benzyl or phenyl which is unsubstituted or substituted by —Cl, —$CH_3$, —$OCH_3$, $C_2$-$C_5$—alkoxycarbonyl or $C_2$-$C_5$—N—alkylcarbamoyl and $R_{12}$ being —$CH_3$ or phenyl which is unsubstituted or substituted by —Cl, —$CH_3$, —$OCH_3$, —$NO_2$ or $C_2$-$C_5$—N—alkylcarbamoyl, and B is —H, —NHCONH_2$. —$NHCONHR_2$, —$NHCSNH_2$, —NHC(NH)$NH_2$, —$NHR_2$ or —$NHCOR_3$, $R_2$ being phenyl which is unsubstituted or substituted by —Cl, —$CF_3$, $C_1$-$C_4$—alkyl, $C_1$-$C_4$—alkoxy, —$NO_2$, —CN, —$CONH_2$, —$SO_2NH_2$, —$CONHC_1$-$C_4$—alkyl, —$CONHC_6H_5$, $C_2$-$C_5$—alkoxycarbonyl, phenoxycarbonyl, $C_2$-$C_5$—N—alkylcarbamoyl, —$NHCOC_6H_5$, —$SO_2NHC_1$-$C_4$—alkyl or —$SO_2NHC_6H_5$, $R_3$ being phenyl which is unsubstituted or substituted by —Cl, $C_1$-$C_4$—alkyl, $C_1$-$C_4$—alkoxy, —$NO_2$, $C_2$-$C_5$—N—alkylcarbamoyl or —$NHCOC_6H_5$, or is a heterocyclic aromatic radical and the metal is Ni or Cu.

The alkyl and alkoxy groups in the various above-mentioned phenyl radicals $R_4$, $R_5$, $R_6$ and $R_{10}$ and $C_1$-$C_4$—alkyl $R_4$, $R_5$, $R_6$, $R_{10}$ and $R_{11}$ are the same groups as previously listed when defining the corresponding symbols B, $R_1$, $R_2$ and $R_3$. The same applies to the definition of the groups $C_2$-$C_5$—alkoxycarbonyl, $C_2$-$C_5$—N—alkylcarbamoyl, —CONH—$C_1$-$C_4$—alkyl and —$SO_2NH$—$C_1$-$C_4$—alkyl.

Of very particular interest are the metal complexes of compounds of the formula I in which R is —H, $R_1$ is —H or —$CH_3$, A is a radical of the formula III in which $R_7$ is —H, —Cl, —$CH_3$, —$OCH_3$, —$NO_2$, —CN, —$CF_3$, —COOH, —$COOCH_3$, —$CONH_2$, —$CONHC_6H_5$, —$NHCOCH_3$ or —$NHCOC_6H_5$, $R_8$ is —H, —Cl, —$CH_3$ —$OCH_3$, —$CONH_2$ or —$COOCH_3$ and $R_9$ is —H or —Cl, B is a radical of the formula —$NHCONH_2$ or —$NHCOR_3$, $R_3$ being phenyl which is unsubstituted or substituted by one or two chlorine atoms and/or one or two methyl groups or by methoxy, nitro or acetylamino group, or is 4-pyridyl and the metal is Ni or Cu.

The compounds of the formulae I and II can be prepared by methods known per se, for example by diazotisation of an amine of the formula A—$NH_2$ and subsequent coupling of the resulting diazotised compound with an o-hydroxybenzaldehyde or o-hydroxyketone of the formulae IV and V respectively

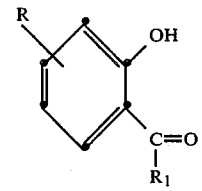
(IV)

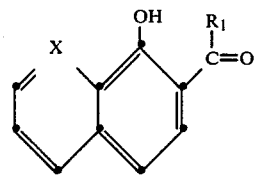
(V)

to give the azo compound of the formulae VI and VII respectively

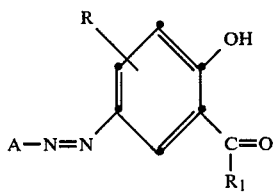
(VI)

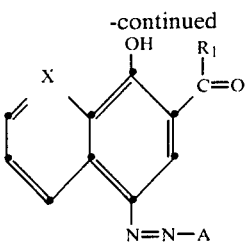

The latter are reacted with a derivative of the formula $H_2N-B$ to give the ligand of the formula I or II and are then converted by means of a suitable transition metal compound into the corresponding metal complexes.

The compounds of the formulae VI and VII are also obtained by diazotisation of an amine of the formula $A-NH_2$ and coupling of the resulting diazo compound with a derivative of the formulae VIII and IX

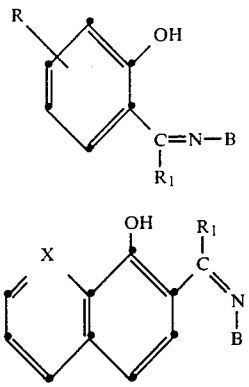

In the formulae IV to IX, A, B, X, R and $R_1$ are as defined above.

The necessary intermediates of the formulae $A-NH_2$, $B-NH_2$ and of the formulae IV and V are known compounds. Examples of compounds of the formula $A-NH_2$ are: aniline, 2-chloroaniline, 3-chloroaniline, 4-chloroaniline, 2-trifluoromethylaniline, 3-trifluoromethylaniline, 2,3-dichloroaniline, 2,4-dichloroaniline, 2,5-dichloroaniline, 3,4-dichloroaniline, 3,5-dichloroaniline, 2-chloro-5-trifluoromethylaniline, 4-chloro-2-trifluoromethylaniline, 2,3,4-trichloroaniline, 2,4,5-trichloroaniline, 2-methylaniline, 3-methylaniline, 4-methylaniline, 2-methyl-3-chloroaniline, 2-methyl-5-chloroaniline, 4-methyl-2-chloroaniline 4-methyl-3-chloroaniline, 5-methyl-2-chloroaniline, 2-methoxyaniline, 3-methoxyaniline, 4-methoxyaniline, 2-methoxy-3-chloroaniline, 2-methoxy-4-chloroaniline, 2-methoxy-5-chloroaniline, 2-cyanoaniline, 2-nitroaniline, 3-nitroaniline, 4-nitroaniline, 2-nitro-4-chloroaniline, 2-nitro-5-chloroaniline, 2-nitro-4-trifluoromethylaniline, 3-nitro-4-chloroaniline, 3-nitro-6-chloroaniline, 4-nitro-2-chloroaniline, 4-nitro-3-chloroaniline, 4-nitro-2-bromoaniline, 2-nitro-4-methylaniline, 2-nitro-4-methoxyaniline, 3-nitro-6-methylaniline, 2-nitro-6-methoxyaniline, 3-nitro-4-methylaniline, 3-nitro-4-methoxyaniline, 4-nitro-2-methylaniline, 4-nitro-2-methoxyaniline, 4-chloro-2,5-dimethylaniline, 4-nitro-2,5-dichloroaniline, 2-methyl-4,5-dichloroaniline, 2-methoxy-4-nitro-5-chloroaniline, 2,5-dimethoxy-4-chloroaniline, 3-acetylaminoaniline, 4-acetylaminoaniline, 2-chloro-5-acetylaminoaniline, 2-methoxy-5-acetylaminoaniline, 2-methyl-5-acetylaminoaniline, ethyl 3-amino-4-chlorobenzoate, ethyl 3-amino-4-methylbenzoate, 3-aminobenzamide, 4-aminobenzamide, 3-amino-4-chlorobenzamide, 3-amino-4-methylbenzamide, 3-amino-4-methoxybenzamide, 3-amino-4-chlorobenzanilide, 3-amino-4-methylbenzanilide, 3-amino-4-methoxybenzanilide, 3-aminobenzenesulfonamide, 4-aminobenzenesulfonamide, 5-aminobenzimidazolone, 5-amino-6-chlorobenzimidazolone, 7-amino-4-methylquinol-2-one, 7-amino-6-chloro-4-methylquinol-2-one, 7-amino-4,6-dimethylquinol-2-one, 7-aminoquinazol-4-one, 6-aminophenmorphol-3-one, 6-aminobenzoxazine-2,4-dione, 1-aminoanthraquinone, 2-aminoanthraquinone, 1-aminonaphthalene, 2-aminoaphthalene, 4-aminoazobenzene, dimethyl aminoterephthalate, dimethyl 5-aminoisophthalate, 1-amino-2-methylanthraquinone, 1-amino-4-acetylaminoanthraquinone and 1-amino-4-benzoylaminoanthraquinone.

Examples of compounds of the formulae IV and V are: 2-hydroxybenzaldehyde, 2-hydroxy-3-chlorobenzaldehyde, 2-hydroxy-4-chlorobenzaldehyde, 2-hydroxy-3-methylbenzaldehyde, 2-hydroxy-4-methylbenzaldehyde, 2-hydroxy-6-methylbenzaldehyde, 2-hydroxy-3-methoxybenzaldehyde, 2-hydroxy-4-methoxybenzaldehyde, 2-hydroxyacetophenone, 2-hydroxy-3-chloroacetophenone, 2-hydroxy-4-chloroacetophenone, 2-hydroxy-3-methylacetophenone, 2-hydroxy-4-methylacetophenone, 2-hydroxy-3-methoxyacetophenone, 2-hydroxy-4-methoxyacetophenone, 2-hydroxybenzophenone, 2-hydroxy-3-chlorobenzophenone, 2-hydroxy-4-chlorobenzophenone, 2-hydroxy-3-methylbenzophenone, 2-hydroxy-4-methylbenzophenone, 2-hydroxy-3-methoxybenzophenone, 2-hydroxy-4-methoxybenzophenone, 2-hydroxy-4,4'-dichlorobenzophenone, 2-hydroxy-3,4'-dichlorobenzophenone, 2-hydroxy-3,6-dimethylbenzaldehyde, 1-hydroxy-2-naphthaldehyde, 1-hydroxy-2-acetylnaphthalene, 1-hydroxy-2-benzoylnaphthalene and 8-hydroxy-7-formylquinoline.

The metallisation is affected with the corresponding metal salts, such as chlorides, sulfates, nitrates or acetates, for example nickel acetate, copper acetate, cobalt acetate or zinc acetate, or the corresponding chlorides, sulfates, nitrates or phosphates. It is also possible to use coordination compounds of the transmission metals mentioned, for example nickel acetylacetonate or copper tetraminosulfate. The metallisation is advantageously carried out in organic solvents.

Examples of solvents are: methanol, ethanol, butanol, ethylene glycol, ethylene glycol monomethyl ether, ethylene glycol monoethyl ether, dimethylformamide, nitrobenzene, dichlorobenzene, toluene and glacial acetic acid. Mixtures of organic solvents and of organic solvents with water and water alone can also be used.

The reaction takes place at elevated temperature, preferably between 50° C. and the boiling point of the solvent used.

The resulting metal complexes of the formulae I and II can be readily isolated by filtration. Any impurities can be removed by washing.

Depending on the nature of their substituents, and on the nature of the polymers to be coloured, the compounds of the formulae I and II can be used as polymer-soluble dyes or in particular as pigments. In the latter case, it is advantageous to convert the products obtained in the synthesis into a finely disperse form. That can be effected in various ways, for example by milling or kneading, advantageously in the presence of milling assistants, such as inorganic or organic salts with or without addition of organic solvents. After the milling the assistants are removed in conventional manner, soluble inorganic salts for example with water and water-insoluble organic salts for example by steam distillation.

It can prove to be advantageous to subject the metal complexes of the formulae I and II to an aftertreatment with organic solvents, preferably with those which boil at above 100° C.

Particularly suitable for this purpose are benzenes which are substituted by halogen atoms or alkyl or nitro groups, sucy as xylenes, chlorobenzene, o-dichlorobenzene, toluene or nitrobenzene, alcohols, such as isopropanol or isobutanol, ketones, such as cyclohexanone, ethers, such as ethylene glycol monomethyl ether or ethylene glycol monoethyl ether, amides, such as dimethylformamide or N-methylpyrrolidone, dimethyl sulfoxide, sulfolane and water alone, if desired under pressure. The aftertreatment can also be carried out in water in the presence of organic solvents and/or with addition of surface-active substances or aliphatic amines or in liquid ammonia.

By means of the abovementioned aftertreatments, it is possible to control or optimise the metal complexes of the formulae I and II in respect of their particle size and their pigment properties, such as tinctorial strength, migration, light and weathering fastness properties, hiding power and transparency.

Depending on the intended use, it is found to be advantageous to use the pigments as toners or in the form of preparations.

The high-molecular organic material to be coloured according to the invention can be of natural or artificial origin. Examples of possible materials are natural resins, drying oils, rubber and casein or modified natural substances, such as chlororubber, oil-modified alkyd resins, viscose, cellulose ethers or esters, such as cellulose acetate, cellulose propionate, cellulose acetobutyrate or nitrocellulose but in particular synthetic organic polymers (thermosets and thermoplastics), as obtained by polymerisation, polycondensation or polyaddition. Examples from the class of polymerisation resins are primarily polyolefines, such as polyethylene, polypropylene or polyisobutylene, substituted polyolefines, such as polymers of vinyl chloride, vinyl acetate, styrene, acrylonitrile, acrylate ester and/or methacrylate ester or butadiene, and copolymers of the monomers mentioned, in particular ABS or EVA.

Examples from the class of polyaddition resins and polycondensation resins are the condensation products of formaldehyde with phenols, namely the so-called phenolic resins, and the condensation products of formaldehyde with urea, thiourea and melamine, namely the so-called amino resins; the polyesters, both saturated, for example alkyd resins, and unsaturated, for example maleate resins, which are used as coating resins; and the linear polyesters and polyamides or silicones.

The high-molecular compounds mentioned can be present individually or in mixtures, as amorphous compositions or melts which, if desired, can be spun into fibres.

They can also be present in the polymerised state in dissolved form as film-formed agents or binders for paints or printing inks, such as linseed oil varnish, nitrocellulose, alkyd resins, melamine resins, urea-formaldehyde resins and acrylic resins.

The high-molecular organic substances are pigmented with the compounds of the formulae I and/or II, for example, by admixing these substrates with such a pigment, if desired in the form of a masterbatch, using rolling mills and mixing or milling apparatus. The pigmented material is then poured onto the desired final shape using methods known per se, such as calendering, pressing, extruding, brushing, spinning, casting or injection-moulding. In the preparation of non-rigid shapes or to reduce their brittleness, it is frequently desirable to mix the high-molecular compounds before their shaping stage with plasticisers. Examples thereof are esters of phosphoric acid, phthalic acid or sebacic acid. The plasticisers can be incorporated into the polymers in the process according to the invention before or after the pigment dye is incorporated. It is also possible—for the purpose of obtaining different hues—to include in the high-molecular organic substances, aside from the compounds of the formulae I and II, also fillers and other colouring components, such as white, coloured or black pigments in any amounts.

For the pigmentation of paints and printing inks, the high-molecular organic materials and the metal complexes of the formulae I and II are finely dispersed or dissolved in a common organic solvent or solvent mixture, if desired together with additives such as fillers, other pigments, siccatives or plasticisers. A possible procedure to this end is to disperse or dissolve the individual components separately or a number of components together, and only then to combine all the components.

Incorporated into plastics, the metal complexes to be used according to the invention can stabilise the plastics to the effects of light and weather. That is of particular importance if the coloured polymers, in particular polypropylene, are processed into fibres.

Incorporated into photostabilised high-molecular organic material, the metal complexes to be used according to the invention generally have no adverse effect on the photostability of the material. In some circumstances, it will even be noted that there is a synergistic improvement in the photostability.

The colorations obtained preferably contain 0.01–20% by weight of a compound of the formula I or II, for example in plastics, fibres, paints and prints, and are distinguished by high dispersibility, cross-painting, migration, heat, light and weathering fastness, a high tinctorial strength and by a high gloss.

Present in the polymers used in the form of solutions, the compounds of the formulae I and/or II are likewise distinguished by a pure hue, a high tinctorial strength and light fastness.

In the examples which follow, the percentages are by weight.

EXAMPLE 1

35.2 g of 5-(2',5'-dichlorophenylazo)-2-hydroxybenzaldehydesemicarbazone are suspended at 70° C. in 350 ml of ethylcellosolve, and a solution of 21 g of copper-(II) acetate in 550 ml of ethylcellosolve is added. The resulting mixture is stirred at 100°–110° C. for 5 hours, and the product is then filtered off and washed with ethylcellosolve, then isopropanol and finally water. Drying at 70°–80° C. in vacuo leaves 25.3 g of a yellow powder of the following formula

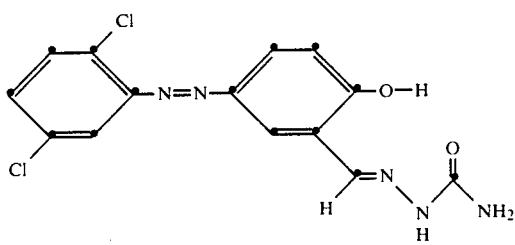

in the form of the 1:1 copper complex, having the following microanalysis ($C_{14}H_9Cl_2N_5O_2 \cdot Cu$):

|  | C | H | Cl | N | Cu |
|---|---|---|---|---|---|
| calculated (in %): | 40.65 | 2.19 | 17.14 | 16.93 | 15.36 |
| found (in %): | 40.00 | 2.46 | 16.63 | 16.37 | 15.20 |

EXAMPLES 2–12

The procedure described in Example 1 is used to obtain further yellow 1:1 or 1:2 metal complexes by reacting 2-hydroxybenzaldehyde with the diazotised amine indicated in column II of Table 1 below, condensing the resulting 5-arylazo-2-hydroxybenzaldehyde derivative with semicarbazide, and subsequently converting the resulting semicarbazone derivative of the formula X with nickel acetate or copper acetate into the corresponding metal complex of column IV.

TABLE 1

| Example No. | II | A' | IV (*) |
|---|---|---|---|
| 2 | 2,5-Dichloroaniline | 2,5-dichlorophenyl | 1:2 Ni |
| 3 | 2-Chloroaniline | 2-chlorophenyl | 1:1 Cu |
| 4 | 2-Chloroaniline | 2-chlorophenyl | 1:2 Ni |
| 5 | 4-Chloroaniline | 4-chlorophenyl | 1:1 Cu |
| 6 | 4-Chloroaniline | 4-chlorophenyl | 1:2 Ni |
| 7 | 2-Methoxy-4-nitroaniline | 2-methoxy-4-nitrophenyl | 1:1 Cu |
| 8 | 2-Methoxy-4-nitroaniline | 2-methoxy-4-nitrophenyl | 1:2 Ni |
| 9 | 3-Acetylaminoaniline | 3-acetylaminophenyl | 1:1 Cu |
| 10 | 3-Acetylaminoaniline | 3-acetylaminophenyl | 1:2 Ni |
| 11 | 5-Aminobenzimidazol-2-one | 2-oxobenzimidazol-5-yl | 1:1 Cu |
| 12 | 5-Aminobenzimidazol-2-one | 2-oxobenzimidazol-5-yl | 1:2 Ni |

(*): Ratio of metal to ligand of the formula (X)

EXAMPLE 13

16.7 g of 5-(4'-chlorophenylazo)-2-hydroxybenzaldehydethiosemicarbazone are suspended at 70° C. in 200 ml of of ethylcellosolve, and a solution of 13.6 g of Nickel(II) acetate.4H₂O in 250 ml of ethylcellosolve is added. The resulting mixture is stirred at 100°–110° C. for 5 hours, and the product is then filtered off and washed with ethylcellosolve, then isopropanol and finally water. Drying at 70°–80° C. in vacuo leaves 16.9 g of a yellow powder of the following formula

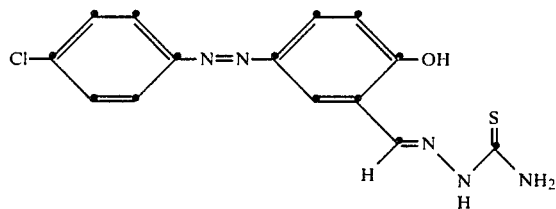

in the form of the 1:1 nickel complex.

On heating to 100°–140° C. the product loses 1% water and then has the following combustion analysis:

|  | C | H | Cl | N | S | Ni |
|---|---|---|---|---|---|---|
| Calculated (in %): | 42.6 | 2.7 | 9.0 | 17.8 | 8.2 | 14.9 |
| Found (in %): | 42.9 | 2.9 | 8.7 | 17.3 | 7.3 | 14.6 |

EXAMPLES 14 TO 24

The procedure described in Example 13 is used to obtain further yellow 1:1 metal complexes by coupling 2-hydroxybenzaldehyde with the diazotised amine indicated in column II of Table 2 below, condensing the resulting 5-arylazo-2-hydroxybenzaldehyde with thiosemicarbazide, and subsequently converting the resulting thiosemicarbazone derivative of the formula XI with nickel acetate or copper acetate into the metal complex of column IV.

TABLE 2

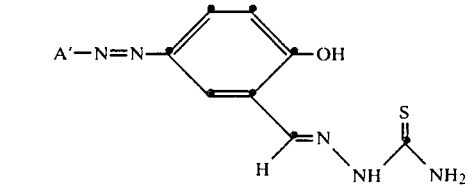

(XI)

| Example No. | II | A' | IV (*) |
|---|---|---|---|
| 14 | 4-Chloroaniline | ⟨4-Cl-C6H4⟩ | 1:1 Cu |
| 15 | 2-Chloroaniline | ⟨2-Cl-C6H4⟩ | 1:1 Cu |
| 16 | 2-Chloroaniline | ⟨2-Cl-C6H4⟩ | 1:1 Ni |

TABLE 2-continued (XI formula shown)

| Example No. | II | A' | IV (*) |
|---|---|---|---|
| 17 | 2,5-Dichloroaniline | ⟨2,5-Cl2-C6H3⟩ | 1:1 Cu |
| 18 | 2,5-Dichloroaniline | ⟨2,5-Cl2-C6H3⟩ | 1:1 Ni |
| 19 | 2-Methoxy-4-nitroaniline | ⟨2-OCH3-4-NO2-C6H3⟩ | 1:1 Cu |
| 20 | 2-Methoxy-4-nitroaniline | ⟨2-OCH3-4-NO2-C6H3⟩ | 1:1 Ni |
| 21 | 3-Acetylaminoaniline | ⟨3-NHCOCH3-C6H4⟩ | 1:1 Cu |
| 22 | 3-Acetylaminoaniline | ⟨3-NHCOCH3-C6H4⟩ | 1:1 Ni |
| 23 | 5-Aminobenzimidazol-2-one | ⟨benzimidazol-2-one-5-yl⟩ | 1:1 Cu |
| 24 | 5-Aminobenzimidazol-2-one | ⟨benzimidazol-2-one-5-yl⟩ | 1:1 Ni |

(*): Ratio of metal to ligand of the formula (XI)

EXAMPLE 25

19.7 g of 5-(2'-chlorophenylazo)-2-hydroxybenzaldehyde-4''-phenylsemicarbazone are suspended at 70° C. in 300 ml of ethylcellosolve, and a solution of 13.6 g of nickel (II) acetate.4H$_2$O in 250 ml of ethylcellosolve is added. The resulting mixture is stirred at 100°–110° C. for 5 hours, and the product is then filtered off and washed with ethylcellosolve, then isopropanol and finally water. Drying at 70°–80° C. in vacuo leaves 19.5 g of a yellow powder of the following formula

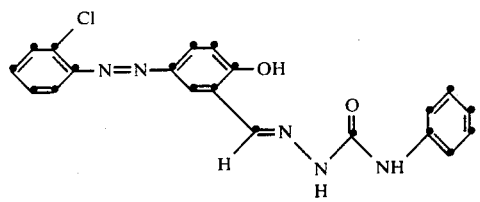

in the form of the 1:1 nickel complex

EXAMPLES 26 TO 36

The procedure described in Example 25 is used to obtain further yellow 1:1 metal complexes by coupling 2-hydroxybenzaldehyde with the diazotised amine indicated in column II of Table 3 below, condensing the resulting 5-arylazo-2-hydroxybenzaldehyde with 4-phenylsemicarbazide, and subsequently converting the resulting semicarbazone of the formula XII with nickel acetate or copper acetate into the metal complex of column IV.

TABLE 3

| Example No. | II | A'' | IV* |
|---|---|---|---|
| 26 | 2-Chloroaniline | (3-Cl phenyl) | 1:1 Cu |
| 27 | 4-Chloroaniline | (4-Cl phenyl) | 1:1 Ni |
| 28 | 4-Chloroaniline | (4-Cl phenyl) | 1:1 Cu |
| 29 | 2,5-Dichloroaniline | (2,5-diCl phenyl) | 1:1 Ni |
| 30 | 2,5-Dichloroaniline | (2,5-diCl phenyl) | 1:1 Cu |
| 31 | 2-Methoxy-4-nitro-aniline | (2-OCH$_3$, 4-NO$_2$ phenyl) | 1:1 Cu |
| 32 | 2-Methoxy-4-nitro-aniline | (2-OCH$_3$, 4-NO$_2$ phenyl) | 1:1 Ni |
| 33 | 3-Acetylamino-aniline | (3-NHCOCH$_3$ phenyl) | 1:1 Cu |
| 34 | 3-Acetylamino-aniline | (3-NHCOCH$_3$ phenyl) | 1:1 Ni |
| 35 | 5-Aminobenzimidazol-2-one | (benzimidazol-2-one-5-yl) | 1:1 Cu |
| 36 | 5-Aminobenzimidazol-2-one | (benzimidazol-2-one-5-yl) | 1:1 Ni |

*Ratio of metal to ligand of the formula (XII)

EXAMPLE 37

19.5 g of 5-(4'-nitrophenylazo)-2-hydroxybenzaldehydebenzoylhydrazone are suspended at 70° C. in 250 ml of ethylcellosolve, and a solution of 13.6 g of nickel-(II) acetate.4H₂O in 250 ml of ethylcellosolve is added. The resulting mixture is stirred at 100°–110° C. for 5 hours, and the product is then filtered off and washed with ethylcellosolve, then isopropanol and finally water. Drying at 70°–80° C. in vacuo leaves 19.4 g of a red powder of the following formula

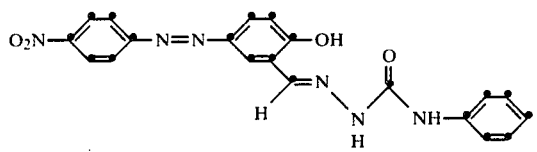

in the form of the 1:2 nickel complex.

The product contains water and, after thorough drying, has the following microanalysis:

|  | C | H | N | Ni |
|---|---|---|---|---|
| Calculated (in %): | 57.8 | 2.9 | 16.9 | 7.1 |
| Found (in %): | 56.8 | 3.5 | 16.7 | 7.0 |

EXAMPLES 38 TO 70

The procedure described in Example 37 is used to obtain further 1:1 or 1:2 metal complexes by coupling 2-hydroxybenzaldehyde with the diazotised amine indicated in column II of Table 4 below, condensing the resulting 5-arylazo-2-hydroxybenzaldehyde with benzoic hydrazide, and subsequently converting the resulting hydrazone derivatives of the formula XIII

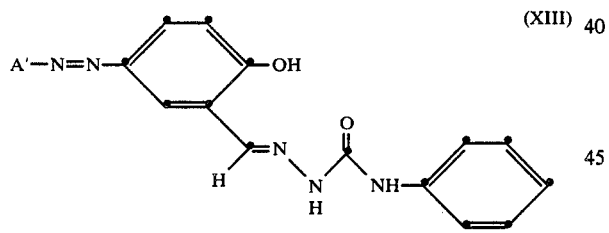

(XIII)

[A'=radical of the diazotised amine indicated in column II of Table 4] with nickel acetate or copper acetate into the metal complex of column III.

Column IV indicates the hue in PVC film (0.2% pigment concentration).

TABLE 4

| Example No. | II | III(*) | IV* |
|---|---|---|---|
| 38 | 4-Nitroaniline | 1:1 Cu | reddish brown |
| 39 | Aniline | 1:1 Cu | green |
| 40 | Aniline | 1:2 Ni | yellow |
| 41 | 2-Chloroaniline | 1:1 Cu | yellow |
| 42 | 2-Chloroaniline | 1:2 Ni | yellow |
| 43 | 3-Chloroaniline | 1:1 Cu | yellow |
| 44 | 3-Chloroaniline | 1:2 Ni | yellow |
| 45 | 2,5-Dichloroaniline | 1:1 Cu | reddish yellow |
| 46 | 2,5-Dichloroaniline | 1:2 Ni | reddish yellow |
| 47 | 2,4-Dichloroaniline | 1:1 Cu | greenish yellow |
| 48 | 2,4-Dichloroaniline | 1:2 Ni | reddish yellow |
| 49 | 3,5-Dichloroaniline | 1:1 Cu | greenish yellow |
| 50 | 3,5-Dichloroaniline | 1:2 Ni | reddish yellow |

TABLE 4-continued

| Example No. | II | III(*) | IV* |
|---|---|---|---|
| 51 | 2-Chloro-5-trifluoromethylaniline | 1:1 Cu | greenish yellow |
| 52 | 2-Chloro-5-trifluoromethylaniline | 1:2 Ni | reddish yellow |
| 53 | 3-Acetylaminoaniline | 1:1 Cu | greenish yellow |
| 54 | 3-Acetylaminoaniline | 1:2 Ni | reddish yellow |
| 55 | 2-Chloro-4-nitroaniline | 1:1 Cu | reddish brown |
| 56 | 2-Chloro-4-nitroaniline | 1:2 Ni | bluish red |
| 57 | 2-Methoxy-4-nitroaniline | 1:1 Cu | reddish brown |
| 58 | 2-Methoxy-4-nitroaniline | 1:2 Ni | bluish red |
| 59 | 2,5-Dichloro-4-nitroaniline | 1:1 Cu | reddish brown |
| 60 | 2,5-Dichloro-4-nitroaniline | 1:2 Ni | bluish red |
| 61 | Ethyl 3-amino-4-chlorobenzoate | 1:1 Cu | greenish yellow |
| 62 | Ethyl 3-amino-4-chlorobenzoate | 1:2 Ni | reddish yellow |
| 63 | 3-Amino-4-chlorobenzamide | 1:1 Cu | greenish yellow |
| 64 | 3-Amino-4-chlorobenzamide | 1:2 Ni | reddish yellow |
| 65 | 3-Amino-4-methoxybenzanilide | 1:1 Cu | greenish yellow |
| 66 | 3-Amino-4-methoxybenzanilide | 1:2 Ni | reddish yellow |
| 67 | 5-Aminobenzimidazol-2-one | 1:1 Cu | greenish yellow |
| 68 | 5-Aminobenzimidazol-2-one | 1:1 Ni | reddish yellow |
| 69 | 7-Amino-4-methylquinol-2-one | 1:1 Cu | greenish yellow |
| 70 | 7-Amino-4-methylquinol-2-one | 1:1 Ni | reddish yellow |

(*)Ratio of metal to ligand of the formula XIII)

EXAMPLE 71

21.3 g of 5-(4'-methylquinol-2'-on-7'-ylazo)-2-hydroxybenzaldehyde isonicotinic hydrazone are suspended at 70° C. in 250 ml of ethylcellosolve, and a solution of 10.9 g of copper(II) acetate. H₂O in 400 ml of ethylcellosolve is added. The resulting mixture is stirred at 100°–110° C. for 5 hours, the product was then filtered off and washed with ethylcellosolve, then isopropanol and finally water. Drying at 70°–80° C. in vacuo leaves 20.8 g of a brown powder of the following formula

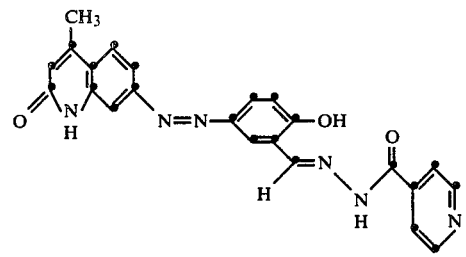

in the form of 1:1 nickel complex.

The product contains water of crystallisation and has the following microanalysis:

|  | C | H | N | Cu |
|---|---|---|---|---|
| Found (in %): | 53.4 | 4.0 | 15.9 | 12.9 |

EXAMPLES 72 TO 103

The procedure described in Example 71 is used to obtain further 1:1 metal complexes by coupling 2-hydroxybenzaldehye with the diazotised amine indicated in column II of Table 5 below, condensing the resulting 5-arylazo-2-hydroxybenzaldehyde with isonicotinic hydrazide, and subsequently converting the product of the formula XIV

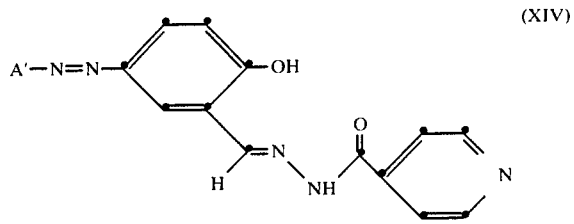

(XIV)

[A' = radical of the diazotised amine indicated in column II of Table 5]
with nickel acetate or copper acetate into the metal complex of column III. Column IV indicates the hue of a plasticised PVC film (0.2% pigment concentration).

TABLE 5

| Example No. | II | III | IV |
|---|---|---|---|
| 72 | 7-Amino-4-methyl-quinol-2-one | Ni | brownish red |
| 73 | Aniline | Cu | yellow |
| 74 | Aniline | Ni | reddish yellow |
| 75 | 2-Chloroaniline | Cu | yellow |
| 76 | 2-Chloroaniline | Ni | reddish yellow |
| 77 | 3-Chloroaniline | Cu | yellow |
| 78 | 3-Chloroaniline | Ni | reddish yellow |
| 79 | 4-Chloroaniline | Cu | yellow |
| 80 | 4-Chloroaniline | Ni | reddish yellow |
| 81 | 2,5-Dichloroaniline | Cu | yellow |
| 82 | 2,5-Dichloroaniline | Ni | reddish yellow |
| 83 | 3,5-Dichloroaniline | Cu | yellow |
| 84 | 3,5-Dichloroaniline | Ni | reddish yellow |
| 85 | 2-Chloro-5-trifluoromethyl-aniline | Cu | greenish yellow |
| 86 | 2-Chloro-5-trifluoromethyl-aniline | Ni | reddish yellow |
| 87 | 3-Acetylaminoaniline | Cu | greenish yellow |
| 88 | 3-Acetylaminoaniline | Ni | reddish yellow |
| 89 | 4-Nitroaniline | Cu | brownish yellow |
| 90 | 4-Nitroaniline | Ni | bluish red |
| 91 | 2-Methoxy-4-nitroaniline | Cu | brown |
| 92 | 2-Methoxy-4-nitroaniline | Ni | brown |
| 93 | 2-Chloro-4-nitroaniline | Cu | brown |
| 94 | 2-Chloro-4-nitroaniline | Ni | brown |
| 95 | 2,5-Dichloro-4-nitroaniline | Cu | brown |
| 96 | 3-Amino-4-chlorobenzamide | Cu | yellow |
| 97 | 3-Amino-4-chlorobenzamide | Ni | reddish yellow |
| 98 | 3-Amino-4-methoxybenzanilide | Cu | greenish yellow |
| 99 | 3-Amino-4-methoxybenzanilide | Ni | reddish yellow |
| 100 | Ethyl 3-amino-4-chlorobenzoate | Cu | greenish yellow |
| 101 | Ethyl 3-amino-4-chlorobenzoate | Ni | reddish yellow |
| 102 | 5-Aminobenzimidazol-2-one | Cu | brown |
| 103 | 5-Aminobenzimidazol-2-one | Ni | beige |

EXAMPLE 104

65 g of stabilised polyvinyl chloride, 35 g of dioctyl phthalate and 0.2 g of finely divided 1:1 copper complex from the benzoylhydrazone of the formula below

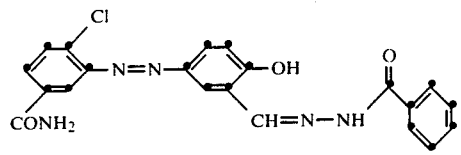

are stirred together, and the mixture is rolled at 160° C. for 7 minutes using a two-roll calender. The result is a yellow-coloured film having very good light and migration fastness.

Preparation of the finely divided form of the above-mentioned 1:1 copper complex: 25 g of 1:1 copper complex, 100 g of finely ground sodium chloride and 30 g of diacetone alcohol are kneaded together with cooling in a laboratory kneader for 5 hours. The resulting mixture is poured into 4,000 ml of water, and the resulting suspension is filtered. The isolated pigment is washed with water and dried at 80° C. in vacuo.

EXAMPLE 105

10 g of titanium dioxide and 2 g of 1:1 copper complex from the semicarbazone of the formula below

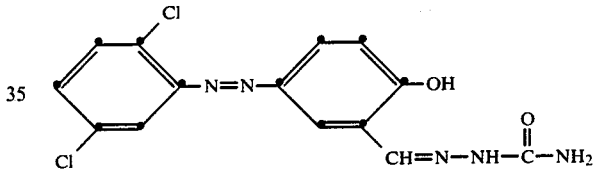

are ball-milled for 48 hours together with 88 g of a mixture of 26.4 g of cocoalkyd resin, 24.0 g of melamine-formaldehyde resin (50% solid content), 8.8 g of ethylene glycol monomethyl ether and 28.8 g of xylene. The result on spraying this paint onto an aluminum foil, predrying at room temperature for 30 minutes and then baking at 120° C. for 30 minutes is a yellow coating which is tinctorially strong and is distinguished by very good cross-painting, light and weathering fastness properties.

EXAMPLE 106

4 g of finely divided pigment of the formula below

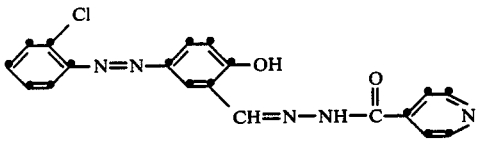

in the form of the 1:1 nickel complex are stirred up in 20 g of solvent of the following composition: 50 g of Solvesso 150 ® (mixture of aromatic hydrocarbons), 15 g of butyl acetate, 5 g of Exkin II ® (ketoxime based flow-control agent), 25 g of methyl isobutyl ketone, 5 g of silicone oil (1% in Solvesso 150 ®). When dispersal is complete (which takes about 15-60 minutes depending on the way the mixture is stirred, the binders, namely 48.3 g of Baycryl L 530 ® (acrylic resin, 61% in 3:1 xylene/butanol) and 23.7 g of Maprenal TTX ® (melamine resin, 55% in butanol), are added. After brief homogenisation, the paint is applied in conventional manner, such as spraying and dipping or specifically for the continuous coating of metal sheets by coil-coating, and baked (at 130° C. for 30 minutes). The resulting yellow coatings are distinguished by very good flow, high gloss and excellent dispersal of the pigment and by good weathering fastness.

EXAMPLE 107

2 g of 1:1 nickel complex from the hydrazone of the formula below

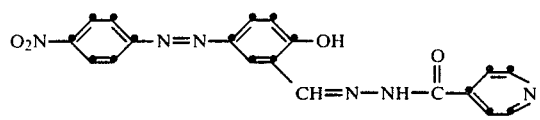

are pasted up with 36 g of alumina hydrate, 60 g of linseed oil varnish of medium viscosity and 2 g of cobalt linoleate using a three-roll mill. The resulting colour paste produces yellow prints which are deeply and highly light-fast.

EXAMPLE 108

A polypropylene granulate suitable for fibre manufacture is thoroughly mixed with 2.5% of a pigment preparation which contains 40% of 1:1 nickel complex from the thiosemicarbazone of the formula below

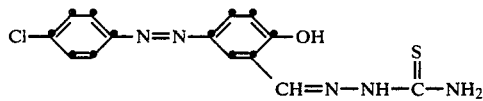

The mixture is spun at 240°–260° C. on a melt-spinning range into filaments which are subsequently stretched in a ratio of 1:4 on a stretch-twist range and are wound up. The result is a deep yellow coloration which is distinguished by good light, wash, dry-cleaning, gas fume fading and peroxide bleach fastness properties. If the example is repeated using polycaprolactam granulate in place of polypropylene granulate and spinning the mixture into filaments at 260°–290° C. the results are likewise very fast yellow colorations.

The preparation used above is prepared as follows:

40 g of yellow pigment, 16 g of Mg behenate and 500 g of sodium chloride are thoroughly mixed in a powder-mixer. This mixture is treated at 130° C. in a laboratory kneading machine. The resulting product is milled with water and is filtered, and the filter cake is washed until salt-free, is dried and is pulverised.

EXAMPLES 109–142

The procedure described in Examples 71 and 37 is repeated, using one of the ligands listed in Tables 6 to 9 and metallising this ligand with copper acetate or nickel acetate. Metal complexes of the formulae XV–XVIII which likewise produce fast yellow colorations in plasticised PVC (0.2% pigment concentration) are obtained.

TABLE 6

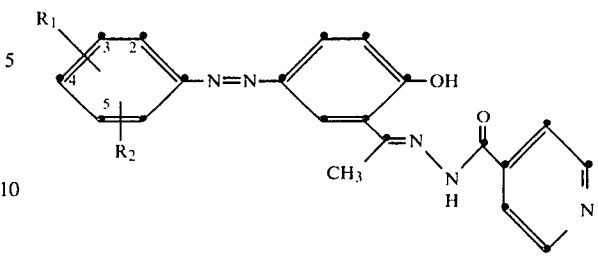

in the form of the 1:1 M complex

| Example No. | $R_1$ | $R_2$ | M | Shade |
|---|---|---|---|---|
| 109 | 2-Cl | H | Cu | yellow |
| 110 | 2-Cl | H | Ni | yellow |
| 111 | 2-Cl | 5-Cl | Cu | yellow |
| 112 | 2-Cl | 5-Cl | Ni | yellow |
| 113 | H | 4-$NO_2$ | Cu | yellow |
| 114 | H | 4-$NO_2$ | Ni | yellow |
| 115 | 2-Cl | 4-$COOCH_3$ | Cu | yellow |
| 116 | 2-Cl | 5-$COOCH_3$ | Ni | yellow |
| 117 | 2-Cl | 5-$CONH_2$ | Cu | yellow |
| 118 | 2-Cl | 5-$CONH_2$ | Ni | yellow |

TABLE 7

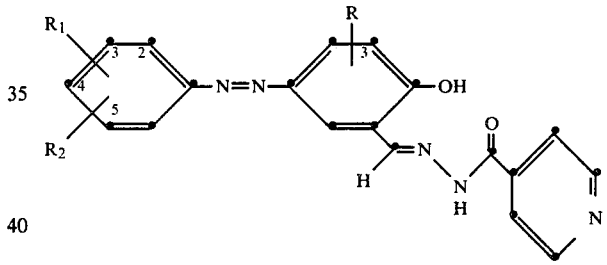

in the form of the 1:1 M complex

| Example No. | R | $R_1$ | $R_2$ | M | Shade |
|---|---|---|---|---|---|
| 119 | H | 2-CN | H | Cu | yellow |
| 120 | H | 2-CN | H | Ni | yellow |
| 121 | H | H | 4-COOH | Cu | yellow |
| 122 | H | H | 4-COOH | Ni | yellow |
| 123 | H | 2-$COOCH_3$ | 5-$COOCH_3$ | Cu | yellow |
| 124 | H | 2-$COOCH_3$ | 5-$COOCH_3$ | Ni | yellow |
| 125 | H | H | 4-NHCO—⌬ | Cu | yellow |
| 126 | H | H | 4-NHCO—⌬ | Ni | yellow |
| 127 | 3-$OCH_3$ | 2-Cl | 5-Cl | Cu | yellow |
| 128 | 3-$OCH_3$ | 2-Cl | 5-Cl | Ni | yellow |

TABLE 8

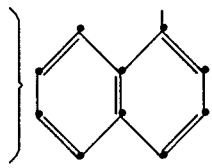

in the form of the 1:1 M complex

| Example No. | $R_1$ | A | M | Shade |
|---|---|---|---|---|
| 129 | H | (naphthyl) | Cu | yellow |
| 130 | H | (naphthyl) | Ni | yellow |
| 131 | H | (anthraquinonyl) | Cu | yellow |
| 132 | H | (anthraquinonyl) | Ni | yellow |

TABLE 9

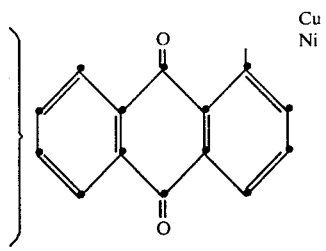
(XVIII)

in the form of the 1:X metal complex

| Example No. | $R_1$ | $R_2$ | $Y_1$ | $Y_2$ | M | 1:X* | Shade in PVC |
|---|---|---|---|---|---|---|---|
| 133 | 2-Cl | 4-Cl | 4-Cl | H | Cu | 1:1 | yellow |
| 134 | 2-Cl | 4-Cl | 4-Cl | H | Ni | 1:2 | yellow |
| 135 | 2-Cl | H | 2-Cl | 4-Cl | Cu | 1:1 | yellow |
| 136 | 2-Cl | H | 2-Cl | 4-Cl | Ni | 1:2 | yellow |
| 137 | 2-Cl | 5-Cl | 3-CH$_3$ | H | Cu | 1:1 | yellow |
| 138 | 2-Cl | 5-Cl | 3-CH$_3$ | H | Ni | 1:2 | yellow |
| 139 | 2-Cl | 5-Cl | 4-OCH$_3$ | H | Cu | 1:1 | yellow |
| 140 | 2-Cl | 5-Cl | 4-OCH$_3$ | H | Ni | 1:2 | yellow |
| 141 | 4-Cl | H | 4-NO$_2$ | H | Cu | 1:1 | yellow |
| 142 | 4-Cl | H | 4-NO$_2$ | H | Ni | 1:2 | yellow |

(*Ratio of metal to ligand of the formula XVIII)

We claim:

1. A process for coloring high molecular weight organic material which comprises
incorporating in the organic material an effective amount of a transition metal complex of the ligand compound of formula I or mixtures thereof

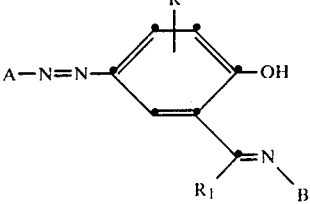

in which

A is substituted or unsubstituted phenyl, biphenyl, naphthyl or anthraquinonyl; or A is a heterocyclic aromatic radical derived from 5-aminobenzimidazolone, 5-amino-1-methylbenzimidazolone, 5-amino-1-n-butylbenzimidazolone, 5-amino-1-phenylbenzimidazolone, 5-amino-1-p-chlorophenylbenzimidazolone, 5-amino-1-p-methylphenylbenzimidazolone, 5-amino-1-p-methoxyphenylbenzimidazolone, 5-amino-6-chlorobenzimidazolone, 5-amino-6-bromobenzimidazolone, 5-amino-6-methylbenzimidazolone, 5-amino-6-methoxybenzimidazolone, 6-aminobenzoxazolone, 5-aminobenzoxazolone, 5-amino-7-chlorobenzoxazolone, 6-amino-5-chlorobenzoxazolone, 6-amino-5-methylbenzoxazolone, 6-amino-5-chlorobenzothiazolone, 6-amino-5-methylbenzothiazolone, 6-aminoquinazol-4-one, 6-amino-2-methylquinazol-4-one, 6-amino-2-methoxyquinazol-4-one, 6-amino-7-chloro-2-methylquinazol-4-one, 7-aminoquinazol-4-one, 2-(4'-aminophenyl)-quinazol-4-one, 2-(3'-aminophenyl)-quinazol-4-one, 2-(4'-amino-3'-methoxyphenyl)-quinazol-4-one, 2-(4'-amino-3-chlorophenyl)-quinazol-4-one, 2-(3'-amino-4'-methylphenyl)-quinazol-4-one, 6-amino-2,4-dihydroxyquinazoline, 7-aminophenmorphol-3-one, 6-aminophenmorphol-3-one, 7-amino-6-chlorophenmorphol-3-one, 7-amino-6-methylphenmorphol-3-one, 7-amino-6-methoxyphenmorphol-3-one, 6-aminoquinol-2-one, 6-amino-4-methylquinol-2-one, 7-amino-4-methylquinol-2-one, 7-amino-4,6-dimethylquinol-2-one, 6-amino-7-chloro-4-methylquinol-2-one, 7-amino-4-methyl-6-methoxyquinol-2-one, 6-amino-1,3-dihydroxyisoquinoline, 6-amino-2,4-dihydroxyquinoline, 6-amino-2,3-dihydroxyquinoxaline or 4-aminophthalimide, R is —H, halogen, C$_1$-C$_4$—alkyl or C$_1$-C$_4$—alkoxy, R$_1$ is —H, C$_1$-C$_4$—alkyl or phenyl which is unsubstituted or substituted by halogen, C$_1$-C$_4$—alkyl, C$_1$-C$_4$—alkoxy, —NO$_2$, —CONH$_2$, CONHR$_2$ or C$_2$-C$_5$—N—alkylcarbamoyl, and B is —H, C$_1$-C$_4$—alkyl, —NHCONH$_2$, —NHCONH—C$_1$-C$_4$—alkyl, —NHCONHR$_2$, —NHCSNH$_2$, —NHCSR$_3$, —NHC(NH)NH$_2$, —NHR$_2$, —NHCOR$_3$, —NHSO$_2$R$_3$, or a heterocyclic aromatic radical derived from 5-aminobenzimidazolone, 5-amino-1-methylbenzimidazolone, 5-amino-1-n-butylbenzimidazolone, 5-amino-1-phenylbenzimidazolone, 5-amino-1-p-chlorophenylbenzimidazolone, 5-amino-1-p-methylphenylbenzimidazolone, 5-amino-1-p-methoxyphenylbenzimidazolone, 5-amino-6-chlorobenzimidazolone, 5-amino-6-bromobenzimidazolone, 5-amino-6-methylbenzimidazolone, 5-amino-6-methoxybenzimidazolone, 6-aminobenzoxazolone, 5-aminobenzoxazolone, 5-amino-7-chlorobenzoxazolone, 6-amino-5-chlorobenzoxazolone, 6-amino-5-methylbenzoxazolone, 6-amino-5-chlorobenzothiazolone, 6-amino-5-methylbenzothiazolone, 6-aminoquinazol-4-one, 6-amino-2-methylquinazol-4-one, 6-amino-2-methoxyquinazol-4-one, 6-amino-7-chloro-2-methylquinazol-4-one, 7-aminoquinazol-4-one, 2-(4'-aminophenyl)-quinazol-4-one, 2-(3'-aminophenyl)-quinazol-4-one, 2-(4'-amino-3'-methoxyphenyl)-quinazol-4-one, 2-(4'-amino-3'-chlorophenyl)-quinazol-4-one, 2-(3'-amino-4'-methylphenyl)-quinazol-4-one, 6-amino-2,4-dihydroxyquinazoline, 7-aminophenmorphol-3-one, 6-aminophenmorphol-3-one, 7-amino-6-chlorophenmorphol-3-one, 7-amino-6-methylphenmorphol-3-one, 7-amino-6-methoxyphenmorphol-3-one, 6-aminoquinol-2-one, 6-amino-4-methylquinol-2-one, 7-amino-4-methylquinol-2-one, 7-amino-4,6-dimethylquinol-2-one, 6-amino-7-chloro-4-methylquinol-2-one, 7-amino-4-methyl-6-methoxyquinol-2-one, 6-amino-1,3-dihydroxyisoquinoline, 6-amino-2,4-dihydroxyquinoline, 6-amino-2,3-dihydroxyquinoxaline or 4-aminophthalimide, $R_2$ being phenyl which is unsubstituted or substituted by halogen, —$CF_3$, $C_1$-$C_4$—alkyl, $C_1$-$C_4$—alkoxy, —$NO_2$, —CN, —$CONH_2$, —$SO_2NH_2$, —CONH-$C_1$-$C_4$—alkyl, —$CONHC_6H_5$, $C_2$-$C_5$—alkoxycarbonyl, phenoxycarbonyl, $C_2$-$C_5$—N—alkylcarbamoyl, —$NHCOC_6H_5$ or —$SO_2NHC_1$-$C_4$—alkyl or —$SO_2NHC_6H_5$ and $R_3$ being phenyl which is unsubstituted or substituted by halogen, $C_1$-$C_4$—alkyl, $C_1$-$C_4$—alkoxy, —$NO_2$, $C_2$-$C_5$—N—alkylcarbamoyl or —$NHCOC_6H_5$ or being a heterocyclic aromatic radical derived from furan-2-carboxylic acid, thiophene-2-carboxylic acid, pyrrole-2-carboxylic acid, pyridine-2-, -3- and -4-carboxylic acid, pyrazinecarboxylic acid, indole-2-carboxylic acid or quinoline-4-carboxylic acid, and the transition metal is a doubly positively charged metal ion of copper or nickel.

2. A process according to claim 1 where in the transition metal complex of formula I A is phenyl which is unsubstituted or substituted by halogen, phenyl, phenylazo, carboxy, —$CF_3$, —$NO_2$, —CN, $C_1$-$C_4$—alkyl, $C_1$-$C_4$—alkoxy, —$CONH_2$, —$SO_2NH_2$, —$CONHR_4$, —$COOR_5$, —$NHCOR_6$ or —$SO_2NHR_4$, $R_4$ being $C_1$-$C_4$—alkyl or phenyl which is unsubstituted or substituted by halogen, —$CF_3$, $C_1$-$C_4$—alkyl, $C_1$-$C_4$—alkoxy, —$NO_2$, —CN, —$CONH_2$, —$SO_2NH_2$, —CONH-$C_1$-$C_4$—alkyl, —$CONHC_6H_5$, $C_2$-$C_5$—alkoxycarbonyl, $C_2$-$C_5$—N—alkylcarbonyl, —$NHCOC_6H_5$, —$SO_2NHC_1$-$C_4$—alkyl or —$SO_2NHC_6H_5$, $R_5$ being $C_1$-$C_4$—alkyl, benzyl which is unsubstituted or substituted by halogen or $C_1$-$C_4$—alkyl or phenyl which is unsubstituted or substituted by halogen, $C_1$-$C_4$—alkyl, $C_1$-$C_4$—alkoxy, $C_2$-$C_5$—alkoxycarbonyl or $C_2$-$C_5$—N—alkylcarbamoyl and $R_6$ being $C_1$-$C_4$—alkyl or phenyl which is unsubstituted or substituted by halogen, $C_1$-$C_4$—alkyl, $C_1$-$C_4$—alkoxy, —$NO_2$, or $C_2$-$C_5$—N—alkylcarbamoyl, and B, R, $R_1$ and the metal area as defined in claim 1.

3. A process according to claim 1 where in the transition metal complex of formula I R is —H, $R_1$ is —H, —$CH_3$ or phenyl, A is the radical of the formula III

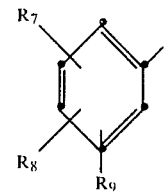

in which $R_7$ is —H, —Cl, —$CH_3$, —$OCH_3$, —$NO_2$, —$CF_3$, —CN, —COOH, —$CONH_2$, —$SO_2NH_2$, —$CONHR_{10}$, —$COOR_{11}$ or —$NHCOR_{12}$, $R_8$ is —H, —Cl, —$CH_3$, —$OCH_3$, —$CONH_2$ or —$COOR_{11}$ and $R_9$ is —H or —Cl, $R_{10}$ being $C_1$-$C_4$—alkyl or phenyl which is unsubstituted or substituted by —Cl, —$CF_3$, —$CH_3$, —$OCH_3$, —$NO_2$, —CN, —$CONH_2$, —$SO_2NH_2$, —$CONHC_1$-$C_4$—alkyl, —$CONHC_6H_5$, $C_2$-$C_5$—alkoxycarbonyl, $C_2$-$C_5$—N—alkylcarbamoyl, —$NHCOC_6H_5$, —$SO_2NHC_6H_5$ or —$SO_2NHC_1$-$C_4$—alkyl, $R_{11}$ being $C_1$-$C_4$—alkyl, benzyl or phenyl which is unsubstituted or substituted by —Cl, —$CH_3$, —$OCH_3$, $C_2$-$C_5$—alkoxycarbonyl or $C_2$-$C_5$—N—alkylcarbamoyl and $R_{12}$ being —$CH_3$ or phenyl which is unsubstituted or substituted by —Cl, —$CH_3$, —$OCH_3$, —$NO_2$ or $C_2$-$C_5$—N-alkylcarbamoyl, and B is —H, —$NHCONH_2$, —$NHCONHR_2$, —$NHCSNH_2$, —NHC(NH)$NH_2$, —$NHR_2$ or —$NHCOR_3$, $R_2$ being phenyl which is unsubstituted or substituted by —Cl, —$CF_3$, $C_1$-$C_4$—alkyl, $C_1$-$C_4$—alkoxy, —$NO_2$, —CN, —$CONH_2$, —$SO_2NH_2$, —$CONHC_1$-$C_4$—alkyl, —$CONHC_6H_5$, $C_2$-$C_5$—alkoxycarbonyl, phenoxycarbonyl, $C_2$-$C_5$—N—alkylcarbamoyl, —$NHCOC_6H_5$, —$SO_2NHC_1$-$C_4$—alkyl or —$SO_2NHC_6H_5$, $R_3$ being phenyl which is unsubstituted or substituted by —Cl, $C_1$-$C_4$—alkyl, $C_1$-$C_4$—alkoxy, —$NO_2$, $C_2$-$C_5$—N—alkylcarbamoyl or —$NHCOC_6H_5$, or is a heterocyclic aromatic radical and the metal is nickel or copper.

4. A process according to claim 3 where in the transition metal complex of formula I R is —H, $R_1$ is —H or —$CH_3$, A is the radical of the formula III in which $R_7$ is —H, —Cl, —$CH_3$, —$OCH_3$, —$NO_2$, —CN, —$CF_3$, —COOH, —$COOCH_3$, —$CONH_2$, —$CONHC_6H_5$, —$NHCOCH_3$ or —$NHCOC_6H_5$, $R_8$ is —H, —Cl, —$CH_3$, $OCH_3$, —$CONH_2$ or —$COOCH_3$ and $R_9$ is —H or —Cl, B is a radical of the formula —$NHCONH_2$ or —$NHCOR_3$, $R_3$ being phenyl which is unsubstituted or substituted by one or two chlorine atoms and/or one or two methyl groups or by methoxy, nitro or acetylamino group, or is 4-pyridyl and the metal is nickel or copper.

5. A colored composition which comprises
(a) a high molecular weight organic material, and
(b) an effective amount of a transition metal complex of the ligand compound of formula I or mixtures thereof

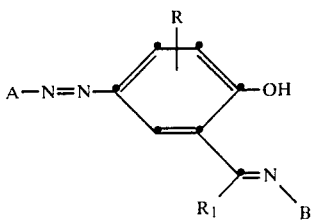

in which

A is substituted or unsubstituted phenyl, biphenyl, naphthyl or anthraquinonyl; or A is a heterocyclic aromatic radical derived from 5-aminobenzimidazolone, 5-amino-1-methylbenzimidazolone, 5-amino-1-n-butylbenzimidazolone, 5-amino-1-phenylbenzimidazolone, 5-amino-1-p-chlorophenylbenzimidazolone, 5-amino-1-p-methylphenylbenzimidazolone, 5-amino-1-p-methoxyphenylbenzimidazolone, 5-amino-6-chlorobenzimidazolone, 5-amino-6-bromobenzimidazolone, 5-amino-6-methylbenzimidazolone, 5-amino-6-methoxybenzimidazolone, 6-aminobenzoxazolone, 5-aminobenzoxazolone, 5-amino-7-chlorobenzoxazolone, 6-amino-5-chlorobenzoxazolone, 6-amino-5-methylbenzoxazolone, 6-amino-5-chlorobenzothiazolone, 6-amino-5-methylbenzothiazolone, 6-aminoquinazol-4-one, 6-amino-2-methylquinazol-4-one, 6-amino-2-methylquinazol-4-one, 6-amino-7-chloro-2-methylquinazol-4-one, 7-aminoquinazol-4-one, 2-(4'-aminophenyl)-quinazol-4-one, 2-(3'-aminophenyl)-quinazol-4-one, 2-(4'-amino-3'-methoxyphenyl)-quinazol-4-one, 2-(4'-amino-3'-chlorophenyl)-quinazol-4-one, 2-(3'-amino-4'-methylphenyl)-quinazol-4-one, 6-amino-2,4-dihydroxyquinazoline, 7-aminophenmorphol-3-one, 6-aminophenmorphol-3-one, 7-amino-6-chlorophenmorphol-3-one, 7-amino-6-methylphenmorphol-3-one, 7-amino-6-methoxyphenmorphol-3-one, 6-aminoquinol-2-one, 6-amino-4-methylquinol-2-one, 7-amino-4-methylquinol-2-one, 7-amino-4,6-dimethylquinol-2-one, 6-amino-7-chloro-4-methylquinol-2-one, 7-amino-4-methyl-6-methoxyquinol-2-one, 6-amino-1,3-dihydroxyisoquinoline, 6-amino-2,4-dihydroxyquinoline, 6-amino-2,3-dihydroxyquinoxaline or 4-aminophthalimide, R is —H, halogen, $C_1$–$C_4$—alkyl or $C_1$–$C_4$—alkoxy, $R_1$ is —H, $C_1$–$C_4$—alkyl or phenyl which is unsubstituted or substituted by halogen, $C_1$–$C_4$—alkyl, $C_1$–$C_4$—alkoxy, —$NO_2$, —$CONH_2$, $CONHR_2$ or $C_2$–$C_5$—N—alkylcarbamoyl, and B is —H, $C_1$–$C_4$—alkyl, —$NHCONH_2$, —NHCONH—$C_1$–$C_4$—alkyl, —NHCONHR$_2$, —NHCSNH$_2$, —NHCSR$_3$, —NHC(NH)NH$_2$, —NHR$_2$, —NHCOR$_3$, —NHSO$_2$R$_3$, or a heterocyclic aromatic radical derived from 5-aminobenzimidazolone, 5-amino-1-methylbenzimidazolone, 5-amino-1-n-butylbenzimidazolone, 5-amino-1-phenylbenzimidazolone, 5-amino-1-p-chlorophenylbenzimidazolone, 5-amino-1-p-methylphenylbenzimidazolone, 5-amino-1-p-methoxyphenylbenzimidazolone, 5-amino-6-chlorobenzimidazolone, 5-amino-6-bromobenzimidazolone, 5-amino-6-methylbenzimidazolone, 5-amino-6-methoxybenzimidazolone, 6-aminobenzoxazolone, 5-aminobenzoxazolone, 5-amino-7-chlorobenzoxazolone, 6-amino-5-chlorobenzoxazolone, 6-amino-5-methylbenzoxazolone, 6-amino-5-chlorobenzothiazolone, 6-amino-5-methylbenzothiazolone, 6-aminoquinazol-4-one, 6-amino-2-methylquinazol-4-one, 6-amino-2-methoxyquinazol-4-one, 6-amino-7-chloro-2-methylquinazol-4-one, 7-aminoquinazol-4-one, 2-(4'-aminophenyl)-quinazol-4-one, 2-(3'-aminophenyl)-quinazol-4-one, 2-(4'-amino-3'-methoxyphenyl)-quinazol-4-one, 2-(4'-amino-3'-chlorophenyl)-quinazol-4-one, 2-(3'-amino-4'-methylphenyl)-quinazol-4-one, 6-amino-2,4-dihydroxyquinazoline, 7-aminophenmorphol-3-one, 6-aminophenmorphol-3-one, 7-amino-6-chlorophenmorphol-3-one, 7-amino-6-methylphenmorphol-3-one, 7-amino-6-methoxyphenmorphol-3-one, 6-aminoquinol-2-one, 6-amino-4-methylquinol-2-one, 7-amino-4-methylquinol-2-one, 7-amino-4,6-dimethylquinol-2-one, 6-amino-7-chloro-4-methylquinol-2-one, 7-amino-4-methyl-6-methoxyquinol-2-one, 6-amino-1,3-dihydroxyisoquinoline, 6-amino-2,4-dihydroxyquinoline, 6-amino-2,3-dihydroxyquinoxaline or 4-aminophthalimide, $R_2$ being phenyl which is unsubstituted or substituted by halogen, —$CF_3$, $C_1$–$C_4$—alkyl, $C_1$–$C_4$—alkoxy, —$NO_2$, —CN, —$CONH_2$, —$SO_2NH_2$, —CONH-$C_1$–$C_4$—alkyl, —CONHC$_6$H$_5$, $C_2$–$C_5$—alkoxycarbonyl, phenoxycarbonyl, $C_2$–$C_5$—N—alkylcarbamoyl, —NHCOC$_6$H$_5$ or —SO$_2$NHC$_1$–$C_4$—alkyl or —SO$_2$NHC$_6$H$_5$ and $R_3$ being phenyl which is unsubstituted or substituted by halogen, $C_1$–$C_4$—alkyl, $C_1$–$C_4$—alkoxy, —$NO_2$, $C_2$–$C_5$—N—alkylcarbamoyl or —NHCOC$_6$H$_5$ or being a heterocyclic aromatic radical derived from furan-2-carboxylic acid, thiophene-2-carboxylic acid, pyrrole-2-carboxylic acid, pyridine-2-, -3- and -4-carboxylic acid, pyrazinecarboxylic acid, indole-2-carboxylic acid or quinoline-4-carboxylic acid, and the transition metal is a doubly positively charged ion of copper or nickel.

6. A composition according to claim 5 where in the transition metal complex of formula I A is phenyl which is unsubstituted or substituted by halogen, phenyl, phenylazo, carboxy, —$CF_3$, —$NO_2$, —CN, $C_1$–$C_4$—alkyl, $C_1$–$C_4$—alkoxy, —CONH2, —$SO_2NH_2$, —CONHR$_4$, —COOR$_5$, —NHCOR$_6$ or —SO$_2$NHR$_4$, R$_4$ being $C_1$–$C_4$—alkyl or phenyl which is unsubstituted or substituted by halogen, —$CF_3$, $C_1$–$C_4$—alkyl, $C_1$–$C_4$—alkoxy, —$NO_2$, —CN, —$CONH_2$, —$SO_2NH_2$, —CONHC$_1$–$C_4$—alkyl, —CONHC$_6$H$_5$, $C_2$–$C_5$—alkoxycarbonyl, $C_2$–$C_5$—N—alkylcarbonyl —NHCOC$_6$H$_5$, —SO$_2$NHC$_1$–$C_4$—alkyl or —SO$_2$NHC$_6$H$_5$, R$_5$ being $C_1$–$C_4$—alkyl, benzyl which is unsubstituted or substituted by halogen or $C_1$–$C_4$—alkyl or phenyl which is unsubstituted or substituted by halogen, $C_1$–$C_4$—alkyl, $C_1$–$C_4$—alkoxy, $C_2$–$C_5$—alkoxycarbonyl or $C_2$–$C_5$—N—alkylcarbamoyl and R$_6$ being $C_1$–$C_4$—alkyl or phenyl which is unsubstituted or substituted by halogen, $C_1$–$C_4$—alkyl, $C_1$–$C_4$—alkoxy, —$NO_2$, or $C_2$–$C_5$—N—alkylcarbamoyl, and B, R, $R_1$ and the metal are as defined in claim 5.

7. A composition according to claim 5 where in the transition metal complex of formula I R is —H, $R_1$ is —H, —$CH_3$ or phenyl, A is the radical of the formula III

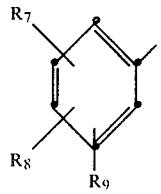
(III)

in which $R_7$ is —H, —Cl, —CH$_3$, —OCH$_3$, —NO$_2$, —CF$_3$, —CN, —COOH, —CONH$_2$, —SO$_2$NH$_2$, —CONHR$_{10}$, —COOR$_{11}$ or —NHCOR$_{12}$, $R_8$ is —H, —Cl, —CH$_3$, —OCH$_3$, —CONH$_2$ or —COOR$_{11}$ and $R_9$ is —H or —Cl, $R_{10}$ being $C_1$-$C_4$—alkyl or phenyl which is unsubstituted or substituted by —Cl, —CF$_3$, —CH$_3$, —OCH$_3$, —NO$_2$, —CN, —CONH$_2$, —SO$_2$NH$_2$, —CONHC$_1$-C$_4$—alkyl, —CONHC$_6$H$_5$, C$_2$-C$_5$—alkoxycarbonyl, C$_2$-C$_5$—N—alkylcarbamoyl, —NHCOC$_6$H$_5$, —SO$_2$NHC$_6$H$_5$ or —SO$_2$NHC$_1$-C$_4$—alkyl, $R_{11}$ being C$_1$-C$_4$—alkyl, benzyl or phenyl which is unsubstituted or substituted by —Cl, —CH$_3$, —OCH$_3$, C$_2$-C$_5$—alkoxycarbonyl or C$_2$-C$_5$—N—alkylcarbamoyl and $R_{12}$ being —CH$_3$ or phenyl which is unsubstituted or substituted by —Cl, —CH$_3$, —OCH$_3$, —NO$_2$ or C$_2$-C$_5$—N—alkylcarbamoyl, and B is —H, —NHCONH$_2$, —NHCONHR$_2$, —NHCSNH$_2$, —NHC(NH)NH$_2$, —NHR$_2$ or —NHCOR$_3$, $R_2$ being phenyl which is unsubstituted or substituted by —Cl, —CF$_3$, C$_1$-C$_4$—alkyl, C$_1$-C$_4$—alkoxy, —NO$_2$, —CN, —CONH$_2$, —SO$_2$NH$_2$, —CONHC$_1$-C$_4$—alkyl, —CONHC$_6$H$_5$, C$_2$-C$_5$—alkoxycarbonyl, phenoxycarbonyl, C$_2$-C$_5$—N—alkylcarbamoyl, —NHCOC$_6$H$_5$, —SO$_2$NHC$_1$-C$_4$—alkyl or —SO$_2$NHC$_6$H$_5$, $R_3$ being phenyl which is unsubstituted or substituted by —Cl, C$_1$-C$_4$—alkyl, C$_1$-C$_4$—alkoxy, —NO$_2$, C$_2$-C$_5$—N—alkylcarbamoyl or —NHCOC$_6$H$_5$, or is a heterocyclic aromatic radical and the metal is nickel or copper.

8. A composition according to claim 7 where in the transition metal complex of formula I R is —H, $R_1$ is —H or —CH$_3$, A is the radical of the formula III in which $R_7$ is —H, —Cl, —CH$_3$, —OCH$_3$, —NO$_2$, —CN, —CF$_3$, —COOH, —COOCH$_3$, —CONH$_2$, —CONHC$_6$H$_5$, —NHCOCH$_3$ or —NHCOC$_6$H$_5$, $R_8$ is —H, —Cl, —CH$_3$, OCH$_3$, —CONH$_2$ or —COOCH$_3$ and $R_9$ is —H or —Cl, B is a radical of the formula —NHCONH$_2$ or —NHCOR$_3$, $R_3$ being phenyl which is unsubstituted or substituted by one or two chlorine atoms and/or one or two methyl groups or by methoxy, nitro or acetylamino group, or is 4-pyridyl and the metal is nickel or copper.

* * * * *